United States Patent [19]

Liles et al.

[11] Patent Number: 5,438,095
[45] Date of Patent: Aug. 1, 1995

[54] PRECURED SILICONE EMULSION

[75] Inventors: Donald T. Liles, Midland, Mich.; Nick E. Shephard, Blacksburg, Va.

[73] Assignee: Dow Corning Corporation, Midland, Mich.

[21] Appl. No.: 113,029

[22] Filed: Aug. 30, 1993

[51] Int. Cl.$^6$ ............................................. C08K 3/10
[52] U.S. Cl. ........................................ 524/785; 524/788; 524/789; 524/837; 524/863
[58] Field of Search .............. 524/837, 863, 789, 788, 524/785

[56] References Cited

U.S. PATENT DOCUMENTS

| | | | |
|---|---|---|---|
| 3,294,725 | 12/1966 | Findley et al. | 260/29.2 |
| 3,383,355 | 5/1968 | Cooper | 260/46.5 |
| 4,341,842 | 7/1982 | Lampe | 524/837 |
| 4,743,474 | 5/1988 | Homan | 427/387 |
| 4,888,380 | 12/1989 | Kamis et al. | 524/588 |
| 4,954,565 | 9/1990 | Liles | 524/837 |
| 5,017,672 | 5/1991 | Krahnke et al. | 528/23 |
| 5,145,907 | 9/1992 | Kalinowski et al. | 524/837 |
| 5,321,075 | 6/1994 | Liles | 524/837 |

*Primary Examiner*—Melvyn I. Marquis
*Assistant Examiner*—Karen A. Dean
*Attorney, Agent, or Firm*—Roger H. Borrousch

[57] ABSTRACT

An aqueous silicone emulsion which yields an elastomer upon removal of the water comprises a polydiorganosiloxane having alkoxysilyl endblocking groups with at least two alkoxy groups attached to the silicon atom, titanium catalyst, and optionally, a filler.

5 Claims, No Drawings

PRECURED SILICONE EMULSION

BACKGROUND OF THE INVENTION

1. Field of the Invention

This invention relates to an aqueous silicone emulsion which gives an elastomer when dried.

2. Background Information

Cooper disclosed in U.S. Pat. No. 3,383,355, issued May 14, 1968 a method for preparing siloxane polymers having alkoxy groups bonded to terminal silicon atoms by reacting a hydroxylated organosiloxane polymer with an alkoxy silane in the presence of a suitable catalyst.

Findley et al. in U.S. Pat. No. 3,294,725, issued Dec. 27, 1966, describe a method for polymerizing organosiloxanes in emulsion using a surface active sulfonic acid catalyst. Their example 16 mixes a hydroxyl endblocked dimethylpolysiloxane with an excess of methyltrimethoxysilane to give a methyldimethoxysilyl endblocked dimethylpolysiloxane which was then emulsified with a nonionic emulsifying agent. Dodecylbenzenesulfonic acid was added and allowed to react for an hour and then the emulsion was neutralized. Upon breaking the emulsion, a fluid was obtained which gelled rapidly. While in emulsion the fluid was not gelled.

Homan describes organopolysiloxane compositions which cure rapidly from the liquid to non-liquid state when exposed to moisture in U.S. Pat. No. 4,743,474, issued May 10, 1988. The compositions contain a metal ester, dissolved in an organopolysiloxane fluid which has moisture-reactive, silicone-bonded alkoxysilylorganic radicals.

Kamis et al. describe a process for making a silicone sealant in U.S. Pat. No. 4,888,380, issued Dec. 19, 1989, which is moisture curable. The process comprises mixing a polydiorganosiloxane having hydroxyl or alkoxy endblocking, an alkoxysilane, titanium catalyst, and reinforcing filler and storing in the absence of moisture.

U.S. Pat. No. 5,017,672, issued May 21, 1991, teaches polyalkoxysilylalkylenedisilazane. These can be reacted with a silanol containing polyorganosiloxane to give a polyalkoxysilyl terminated polydiorganosiloxane.

SUMMARY OF THE INVENTION

An aqueous silicone emulsion which yields an elastomer upon removal of the water comprises an emulsion of a polydiorganosiloxane having at least four silicon-bonded alkoxy groups per molecule, sufficient titanium catalyst to crosslink the polydiorganosiloxane by reaction of the alkoxy groups, and optionally a filler.

DESCRIPTION OF THE INVENTION

This invention relates to an aqueous silicone emulsion which yields an elastomer upon removal of the water comprising the product obtained by mixing (A) 100 parts by weight of polydiorganosiloxane having alkoxysilyl endblocking groups with at least 2 alkoxy radicals attached to the silicon atom, as an aqueous emulsion which is ionically or non-ionically stabilized, (B) sufficient titanium catalyst to crosslink the polydiorganosiloxane of (A), and (C) optionally a filler.

The aqueous silicone emulsion of this invention is unique in that the reactive groups which cause crosslinking of the polymer, so that an elastomer is formed upon removal of the water, are all present on the polymer ends and are not formed by a reaction of the polymer and another ingredient which is present to act as a crosslinker. Each terminal group of the polydiorganosiloxane (A) has either 2 or 3 alkoxy groups attached to silicon. When an ionically or non-ionically stabilized emulsion of this polymer is mixed with a titanium catalyst, the polymer ends react with each other to form a crosslinked polymer within the emulsion micelle. When the water of the emulsion is removed, the crosslinked polymer particles coalesce to form an elastomer. This elastomer can be reinforced by the addition of filler.

The method of this invention uses a polymer of the formula

  (1)

where each R is a radical free of aliphatic unsaturation and is at least one radical selected from the group consisting of monovalent hydrocarbon, monovalent halohydrocarbon, and monovalent cyanoalkyl radicals of 1 to 18 inclusive carbon atoms, each D is selected from the group consisting of radicals of the formula

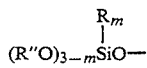

and radicals of the formula

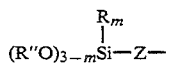

where each R" is at least one radical selected from the group consisting of methyl, ethyl, propyl, and butyl, Z is a divalent hydrocarbon radical or a combination of divalent hydrocarbon radicals and siloxane radicals, m is 0 or 1, x is of a value such that the polymer has a viscosity of from 0.5 to 3000 Pa.s at 25° C., and R is as defined above.

When D of the above polymer (1) is

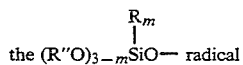

the polymer is of the formula

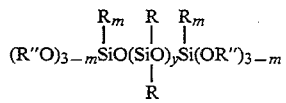

where each R is a radical free of aliphatic unsaturation and is at least one radical selected from the group consisting of monovalent hydrocarbon, monovalent halohydrocarbon, and monovalent cyanoalkyl radicals of 1 to 18 inclusive carbon atoms, each R" is at least one radical selected from the group consisting of methyl, ethyl, propyl, and butyl, m is 0 or 1, and x is of a value such that the polymer has a viscosity of from 0.5 to 3000 Pa.s at 25° C. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl.

Alkoxy endblocked polydiorganosiloxanes are well known types of polymers. They can be prepared by the addition of an excess of alkyltrialkoxysilane to a hydroxy endblocked polydiorganosiloxane.

When (D) of the above polymer (1) is the formula above,

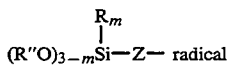

the polymer is of the formula

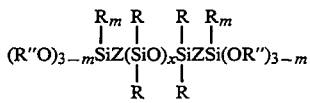

where each R, each R'', m, and x are as defined above, Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene, propylene, hexylene, phenylene, and

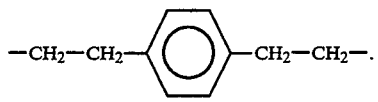

A preferred Z may be represented by the formula

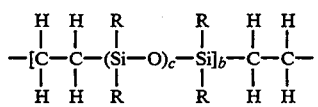

where R is as defined above, b is 0 or 1, and c is from 1 to 6. The preferred viscosity of polymer (1) is from 1 to 1000 Pa.s at 25° C.

Alkoxysilalkylene endblocked polymers of the above formula can be manufactured following the methods taught in U.S. Pat. No. 4,888,380, issued Dec. 19, 1989, which patent is hereby incorporated by reference to show the polymers and their method of manufacture.

The polydiorganosiloxane compositions of this invention are crosslinked with a titanium catalyst. The titanium catalyst can be any of those known to be useful in catalyzing the moisture induced reaction of alkoxy containing siloxanes or silanes. Preferred are a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, bis-(acetylacetonyl)diisopropyltitanate, and 2,5-di-isopropoxy-bis-ethylacetoacetate titanium. The amount of catalyst is from 0.2 to 6.0 parts by weight per 100 parts by weight of polymer (1). Preferred are from 0.5 to 3.0 parts by weight.

Useful silicone elastomeric compositions are commonly produced with a filler as one of the ingredients. These fillers are well known in the industry. They are added to the mixture to provide reinforcement of the polymer so as to control the physical properties of the elastomer which is formed. Reinforcing fillers, such as fumed silica, precipitated silica, and diatomacious earth are used to give the highest physical strengths to the elastomer. Reinforcing fillers are generally recognized as being very fine particles having a surface area from about 50 to 700 $m^2/g$. These fillers may be used with untreated filler surfaces or with treated filler surfaces, the treatment being used to modify the filler surface so that it properly reacts with the polymer and the other ingredients in the sealant. Calcium carbonate fillers are now available which are produced by precipitation which have a surface area of about 20 $m^2/g$ that give a reinforcing effect also. Extending fillers such as titanium dioxide, zirconium silicate, ground calcium carbonate, iron oxide, ground quartz, and carbon black may be used. The amounts of filler used can obviously be varied within wide limits in accordance with the intended use. For example, in some cases the crosslinked polymer could be used with no filler, but it would have very low physical properties. Reinforcing fillers are commonly used in amounts from about 5 to 20 parts by weight to give the highest physical properties, such as tensile strength. Extending fillers are finely ground in that the average particle size is in the range of from about 1 to 10 micrometers. Extending fillers are used to modify the sealant properties and to provide opacity in some cases. When silica is used as the filler there is no problem with the shelf life of the emulsion; unlike those compositions which include polymer, silica, and stannic tin catalyst.

Another type of reinforcement is colloidal silica which is in the form of an aqueous dispersion, such as the NALCOAG dispersions of Nalco Chemical Company. A seperately prepared anionic, stable dispersion of fumed silica in water is available as CAB-O-SPERSE dispersions from the Cab-O-Sil division of Cabot Corporation.

The composition of this invention can be used as a coating for protection or release when applied to surfaces such as cloth or paper and dried. When the composition includes filler it can be used to form paints and sealants, depending upon the amount and type of filler added. In all cases, the composition gives an elastomeric material upon removal of the water and has excellent shelf life as an emulsion before drying.

The following examples are included for illustrative purposes only and should not be construed as limiting the invention which is properly set forth in the appended claims.

EXAMPLE 1

A mixture of 30 g of reaction product containing about 90 percent by weight of trimethoxysilylethylene endblocked polydimethylsiloxane having a viscosity of about 50 Pa.s at 25° C. and 10 percent unreacted ingredients, predominately vinyl endblocked polydimethylsiloxane, was mixed with 3.5 g of an aqueous mixture of sodium lauryl sulfate (44 percent in water) and the mixture was agitated for 1 minute under vacuum in a high speed mixer (WHIP MIX (R)). Next 4 g of deionized water was added to the mixture and stirred for 1 minute. Then 0.45 g of diisopropyl-bis-(ethylacetoacetate)-titanium (TDIDE) was added to the mixture and it was stirred for 1 minute under vacuum. This mixture was an anionic, oil in water emulsion of alkoxy functional polydimethylsiloxane fluid of approximately 80 percent solids. It had a paste-like consistency. The catalyzed emulsion was allowed to stand undisturbed in a closed container for one week. During this time, portions of the emulsion were removed from the container after 1 hour, 1 day, 2 days, and 7 days and smeared onto a plastic dish and allowed to dry. The resulting films were inspected after drying for 24 hours in the air. Only the film which had stood for 7 days before drying was elastomeric. The properties of this film were measured after it had dried for a total of 4 days. The tensile properties are given in Table I.

TABLE I

|  | MPa | psi |
|---|---|---|
| Tensile Strength | 0.29 | 42 |
| 50 percent Modulus | 0.02 | 3 |
| 100 percent Modulus | 0.03 | 5 |
| 150 percent Modulus | 0.05 | 7 |
| 200 percent Modulus | 0.07 | 10 |
| 250 percent Modulus | 0.08 | 12 |
| 300 percent Modulus | 0.1 | 14 |

EXAMPLE 2

In this comparative example, a second emulsion was prepared exactly as the emulsion of example 1, except there was no titanium catalyst added. After 3 days and after 7 days, portions of the emulsion were removed from the closed container and smeared into films. Each film was inspected after air drying for 24 hours. In neither case was the film elastomeric.

EXAMPLE 3

First 90 g of methyldimethoxy endblocked polydimethylsiloxane fluid having a viscosity of about 11.5 Pa.s at 25° C. was added to 10 g of an aqueous mixture of sodium lauryl sulfate (50 percent in water) and the mixture was agititated for 1 minute under vacuum in a high speed mixer (WHIP MIX (R)). Next 4 g of deionized (DI) water was added to this mixture and it was stirred again for 1 minute, also in vacuo. An additional 4 g of DI water was added and the mixture was stirred in vacuo for 1 minute. The resulting composition consisted of an anionically stabilized, oil in water emulsion having a solids content of approximately 84 percent by weight. Average particle size of the emulsion was determined (NIACOMP) to be 1600 nm.

A 30 g portion of the emulsion was placed into a jar followed by 0.48 g of diisopropyl-bis-(ethylacetoacetate)titanium (TDIDE). The mixture was stirred with a spatula for several minutes until the emulsion had a homogeneous appearance. The jar was capped and the emulsion was allowed to stand undisturbed. After 4 hours, a small amount of emulsion was removed and spread into a film. The film was allowed to dry in air for 16 hours. It was inspected and found to be slightly elastomeric. Another sample of the catalyzed emulsion was removed after it had stood undisturbed for 20 hours and this sample was spread into a thin film and allowed to dry for 20 hours. The resulting film was elastomeric.

The film was allowed to dry in air for a total of 7 days then it was allowed to swell (1 inch disks) in heptane for 6 days. Volume swell and gel content were determined:
Volume Swell: 933%
% Gel: 84.8%

Tensile properties of the film were also obtained after it had dried for a total of 7 days and these are given in table II.

TABLE II

|  | Tens. | | Elong. | 50% M | | 100% M | | 200% M | |
|---|---|---|---|---|---|---|---|---|---|
|  | MPa | psi | % | MPa | psi | MPa | psi | MPa | psi |
|  | 0.60 | 87 | 385 | 0.15 | 22 | 0.25 | 36 | 0.37 | 54 |
| Std dev. | 0.1 | 14 | 1 |  | 1 |  | 2 |  | 6 |

EXAMPLE 4

First, 4 g of n-hexane and 0.2 g of tetrabutyltitanate (TBT) was added to 20 g of the methyldimethoxy endblocked polydimethylsiloxane fluid of example 3 and the mixture was shaken until a solution resulted. Then 1.2 g of a 30 percent aqueous solution of sodium lauryl sulfate was added followed by 14.8 g of deionized water. The mixture was emulsified for 2.5 minutes using an ultrasonic probe-type processor. The resulting emulsion was allowed to stand for 24 hours after which hexane was removed by heating the emulsion to 60° C. under vacuum for one hour using a rotary evaporator.

Additional water was added to the emulsion to replace that water that had been removed during evaporation; the resulting composition consisted of an approximately 60 percent solids emulsion of precured polydimethylsiloxane. A film was cast by pouring 8 g of the emulsion into a 100 mm diameter polystyrene Petri dish and allowing the emulsion to dry at ambient conditions for 24 hours. An elastomeric film resulted.

After the film had dried at ambient conditions for an additional 6 days, swell/gel properties were determined by swelling the elastomeric film in hexane. The cured latex had a volume swell of 912+/−27 percent and a gel content of 85.6+/−0.6 percent.

EXAMPLE 5

First, 30 g of the methyldimethoxy endblocked polydimethylsiloxane fluid of example 3 was mixed with 3.5 g of an aqueous mixture of sodium lauryl sulfate (40 percent by weight) and the mixture was stirred for 2 minutes under vacuum in a high speed mixer (Whip Mix). Then 5 g of deionized (DI) water was added to the mixture and it was again agitated for 2 minutes, also in vacuo. An additional 10 g of DI water was added to the mixture and it was agitated in vacuo for 2 minutes. The resulting emulsion was approximately 62 percent solids and it had a mean particle size of 690 nm as determined by light scattering (NIACOMP). Then 30 g of emulsion was weighed into a jar equipped with a stirrer and 0.38 g of diisopropyl-bis-(ethylacetoacetate)-titanium (TDIDE) was added dropwise to the emulsion with stirring. The mixture was stirred for five minutes after catalyst addition and the jar was capped and the emulsion was allowed to remain undisturbed for 18 hours. Then 10 g of the emulsion was poured into a 100 mm diameter polystyrene Petri dish and allowed to air dry for 24 hours. An elastomeric film resulted. The film was allowed to air dry for 6 more days after which its mechanical properties were determined (Instron). These properties are given in table II. Swell/gel properties were determined by swelling the elastomer in heptane for 7 days, see table III.

TABLE III

| Vol Swell | gel | tensile | elong. | 100% modulus |
|---|---|---|---|---|

TABLE III-continued

| % | % | MPa | psi | % | MPa | psi |
|---|---|---|---|---|---|---|
| 924.5 | 84.4 | 0.60 | 87 | 385 | 0.25 | 36 |

EXAMPLE 6

The uncrosslinked emulsion of methyldimethoxy endblocked polydimethylsiloxane fluid of example 3 was aged for 14 months at ambient conditions in a capped container prior to use. Then 20 g of this emulsion was weighed into a jar followed by 0.48 g of diisopropyl-bis-(ethylacetoacetate)titanium. The emulsion was stirred with a spatula for several minutes. Next, 6 g of water was added and the emulsion was again stirred for several minutes. The jar was capped and the emulsion was allowed to remain undisturbed for 24 hours. A portion of the emulsion was spread into a thin film approximately 50 mil in thickness using a chase and it was allowed to dry for 7 days at ambient temperature. Tensile properties of this cured, unfilled emulsion, latex A, were determined using an Instron, see table IV.

To 10g of the emulsion was added with stirring 7 g of aqueous, dispersed, fumed silica (CABOSPERSE F) having a solids content of 12 percent, a pH of 7 and a particle size of 7 nm. This emulsion now contained approximately 10 pph silica based on silicone rubber. Then 8 g of this emulsion was poured into a 100 mm diameter Petri dish and allowed to dry at room temperature for 7 days. Tensile properties of this reinforced elastomer, latex B, were determined using an Instron and the results are given in table IV.

TABLE IV

| Latex | tensile | % elongation | 100% modulus |
|---|---|---|---|
| A | 0.34 MPa | 395 | 0.23 MPa |
| B | 1.46 MPa | 340 | 0.87 MPa |

That which is claimed is:

1. An aqueous silicone emulsion which yields an elastomer upon removal of the water comprising the product obtained by mixing
   (A) 100 parts by weight of polydiorganosiloxane having alkoxysilyl endblocking groups with at least 2 alkoxy radicals attached to the silicon atom, as an aqueous emulsion which is ionically or non-ionically stabilized,
   (B) sufficient titanium catalyst to crosslink the polydiorganosiloxane of (A), where the titanium catalyst is a beta-dicarbonyl titanium compound, and
   (C) optionally a filler.

2. The emulsion of claim 1 in which the alkoxysilyl endblocking group is selected from the group consisting of radicals of the formula

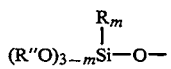

and radicals of the formula

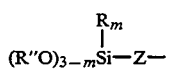

where each R ms a radical free of aliphatic unsaturation and is at least one radical selected from the group consisting of monovalent hydrocarbon, monovalent halohydrocarbon, and monovalent cyanoalkyl radicals of 1 to 18 inclusive carbon atoms and each R″ is at least one radical selected from the group consisting of methyl, ethyl, propyl, and butyl, Z is a divalent hydrocarbon radical or a combination of divalent hydrocarbon radicals and siloxane radicals, and m is 0 or 1.

3. The emulsion of claim 1 in which there is from 0.2 to 6 parts of titanium catalyst.

4. The emulsion of claim 1 in which the polydiorganosiloxane of (A) is an alkoxysilethylene endblocked polydiorganosiloxane.

5. The emulsion of claim 4 in which there is from 0.2 to 6 parts of titanium catalyst and from 5 to 20 parts by weight of reinforcing filler.

* * * * *